United States Patent [19]

Ohta et al.

[11] Patent Number: 4,785,662

[45] Date of Patent: Nov. 22, 1988

[54] DIRECT-HEATED GAS-FLOW MEASURING APPARATUS

[75] Inventors: Minoru Ohta, Okazaki; Kazuhiko Miura, Aichi; Seizi Huzino, Anjyo; Kenji Kanehara, Aichi; Tadashi Hattori, Okazaki, all of Japan

[73] Assignee: Nippon Soken, Inc., Nishio, Japan

[21] Appl. No.: 929,309

[22] Filed: Nov. 12, 1986

Related U.S. Application Data

[63] Continuation-in-part of Ser. No. 724,337, Apr. 17, 1985, abandoned.

[30] Foreign Application Priority Data

Apr. 26, 1984 [JP] Japan .................................. 59-82815
May 10, 1984 [JP] Japan .................................. 59-91804

[51] Int. Cl.$^4$ ................................................ G01F 1/68
[52] U.S. Cl. ............................... 73/204.21; 73/118.2; 73/204.26
[58] Field of Search ................................ 73/204, 118.2

[56] References Cited

U.S. PATENT DOCUMENTS

| | | | |
|---|---|---|---|
| 4,261,199 | 4/1981 | Sauer et al. | 73/204 |
| 4,412,449 | 11/1983 | Elermann et al. | 73/204 |
| 4,478,077 | 10/1984 | Bohrer et al. | 73/204 |
| 4,498,337 | 2/1985 | Gruner | 73/204 |
| 4,527,427 | 7/1985 | Grunwald | 73/204 |
| 4,538,456 | 9/1985 | Gneiss et al. | 73/204 |
| 4,587,842 | 5/1986 | Handtmann | 73/204 |

FOREIGN PATENT DOCUMENTS

| | | | |
|---|---|---|---|
| 0094497 | 11/1983 | European Pat. Off. | 73/204 |
| 1245138 | 9/1971 | United Kingdom . | |
| 2025062 | 1/1980 | United Kingdom | 73/204 |

Primary Examiner—Herbert Goldstein
Attorney, Agent, or Firm—Cushman, Darby & Cushman

[57] ABSTRACT

A direct-heated gas-flow measuring apparatus including a measuring tube disposed in the gas stream, a film resistor for generating heat and detecting the temperature thereof, and a feedback control circuit for controlling the heat generated by the film resistor so that the temperature of the film resistor is a predetermined value. Provided at least at the upstream side of the film resistor near thereto is a shield for reducing the accumulation of deposits on the film resistor. The shield and the film resistor have substantially the same thickness to satisfy the condition:

$$l/t \leq 50$$

where l is a distance therebetween and t is a thickness thereof.

19 Claims, 13 Drawing Sheets

DIRECT-HEATED GAS-FLOW MEASURING APPARATUS

CROSS-REFERENCE TO RELATED APPLICATION

This application is a continuation-in-part of application Ser. No. 724,337 filed on Apr. 17, 1985, for "Direct-heated Gas-Flow Measuring Apparatus", now abandoned.

BACKGROUND OF THE INVENTION (1) Field of the Invention

The present invention relates to a direct-heated gas-flow measuring apparatus having a film resistor which serves as a temperature detecting means as well as an electric heater. Such a direct-heated gas-flow measuring apparatus can be used, for example, for measuring the flow rate of engine intake air.

(2) Description of the Related Art

Generally, in an internal combustion engine, the amount of intake air is one of the most important parameters for controlling the fuel injection amount, ignition timing, and the like. A gas-flow measuring apparatus, i.e., an airflow meter, is provided for measuring the same. One of the more common prior art airflow meters is the vane-type, which is, however, disadvantageous in scale, response speed characteristics and the like. Recently, airflow meters having temperature-dependent resistors have been developed, which are advantageous in scale, response speed characteristics, and the like.

There are two types of airflow meters having temperature- dependent resistors, i.e., the heater-type and direct-heated type. The heater-type airflow meter may consist of an electric heater resistor provided in an intake-air passage of an engine and two temperature-dependent resistors arranged on the upstream and downstream sides of the electric heater resistor. In this case, the temperature-dependent resistor on the downstream side is used for detecting the temperature of air heated by the heater resistor, while the temperature-dependent resistor on the upstream side is used for detecting the temperature of non-heated air. The current flowing through the heater resistor is controlled for a constant difference in temperature between the two temperature-dependent resistors, thereby detecting the voltage applied to the heater resistor as the mass flow rate of air.

In this heater-type airflow meter, if no temperature-dependent resistor upstream is provided and the current of the heater resistor is controlled for a constant temperature of the downstream temperature-dependent resistor, the voltage applied to the heater resistor is detected as the volume flow rate of air.

On the other hand, the direct-heated type airflow meter may consist of a film resistor which serves not only as an electric heater, but also as a temperature-detecting means for detecting the temperature of the heated air. Also, the direct-heated type airflow meter may consist of a temperature-dependent resistor for detecting the temperature of non-heated air. Thus, the current flowing through the film resistor is controlled for a constant difference in temperature between the film resistor and the temperature dependent resistor, thereby detecting the voltage applied to the film resistor as the mass flow rate of air. In this direct-heated type airflow meter, too, if no temperature-dependent resistor is provided and the current of the heater resistor is controlled for a constant temperature of the film resistor, the voltage applied to the film resistor is detected as the volume flow rate of air.

Since the film resistor of the direct-heated type airflow meter serves as a temperature-detecting means for heated air, that is, no additional temperature detecting means for heated air is necessary, the direct-heated type airflow meter is smaller in size than the heater-type airflow meter.

In the direct-heated type airflow meter, the film resistor may consist of an insulating substrate such as a ceramic substrate or monocrystalline silicon substrate, a resistance pattern of platinum (Pt), gold (Au), etc. on the insulating substrate, and a heat-resistant resin on the resistance pattern. It is impossible to burn off suspended particles (mainly, carbon particles) adhered to the boundary region and the stagnation region of the film resistor, since a temperature higher than 800° C. is required for such burn-off and the heat-resistant resin has a low melting temperature such as 400° C. Therefore, the suspended particles adhered to the film resistor remain, increasing the heat capacity and reducing the heat dissipation characteristics, thereby reducing the sensitivity and response speed characteristics of the airflow meter.

SUMMARY OF THE INVENTION

It is an object of the present invention to provide a direct-heated gas-flow measuring apparatus maintaining the sensitivity and response characteristics.

According to the present invention, in a directheated gas-flow measuring apparatus including a measuring tube disposed in a gas stream, a film resistor for generating heat and detecting the temperature thereof, and a feedback control circuit for controlling the heat generated by the film resistor so that the temperature of the film resistor is a predetermined value, a shield for trapping suspended particles in the gas stream is provided at least at the upstream side of the film resistor and near thereto along the same coaxial plane of the film resistor. The shield and the film resistor have substantially the same thickness, to satisfy the condition:

$$l/t \leqq 50$$

where l is a distance between the shield and the film resistor and t is a thickness of the shield and the film resistor. Thus, the accumulation deposits on the film resistor can be reduced. Note that, since the shield is substantially separated from the film resistor, the thermal characteristics of the film resistor are not determined.

BRIEF DESCRIPTION OF THE DRAWINGS

The present invention will be more clearly understood from the description as set forth below with reference to the accompanying drawings, wherein.

DESCRIPTION OF THE PREFERRED EMBODIMENTS

Figure 1:
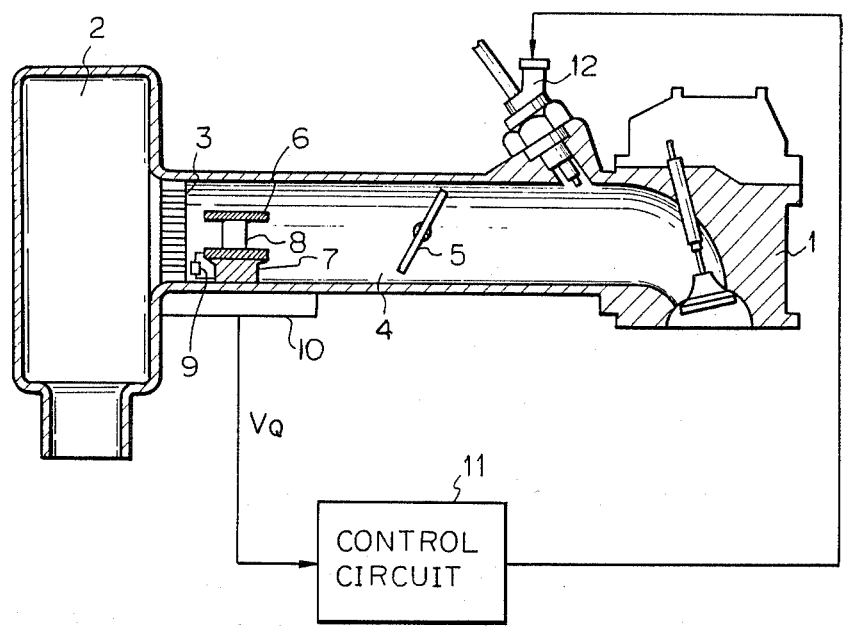
FIG. 1 is a schematic diagram showing the overall configuration of an internal combustion engine including a direct-heated type gas-flow measuring apparatus.

In FIG. 1, which illustrates the overall configuration of an internal engine including a gas-flow measuring apparatus, reference numeral 1 designates a spark ignition engine for driving an automobile in which air for combustion is sucked through an air cleaner 2, a rectifier grid 3 for making the air flow uniform, and an intake air passage 4. Provided in the intake air passage 4 is a throttle valve 5 arbitrarily operated by a driver. The gas-flow measuring apparatus is provided in the intake air passage 4 between the rectifier grid 3 and the throttle valve 5.

The gas-flow measuring apparatus includes a sensing portion inside of the intake air passage 4 and a sensing circuit 10 outside of the intake air passage 4. The sensing portion includes a measuring tube (or duct) 6 fixed by a stay 7 to the intake air passage 4. A film resistor 8 is provided inside of the duct 6, while a temperature-dependent resistor 9 for detecting the temperature of non-heated air is provided outside of the duct 6. The film resistor 8 and the temperature-dependent resistor 9 are connected to the sensing circuit 10 encapsulated in a hybrid board. Note that the temperature dependent resistor 9 can be disposed within the duct 6, under the condition that the resistor 9 is not substantially affected by the heat generated from the film resistor 8. The sensing circuit 10 controls the current flowing to the film resistor 8 to generate heat for a constant difference in temperature between the film resistor 7 and the temperature-dependent resistor 9. Also, the sensing circuit 10 generates an output voltage $V_Q$ and transmits it to a control circuit 11, which includes, for example, a microcomputer. The control circuit 11 also receives various kinds of detecting signals such as an engine speed signal Ne (not shown) and an engine coolant temperature signal THW (not shown) and controls the valve opening time period of a fuel injection valve 12 and the like.

Figure 2:
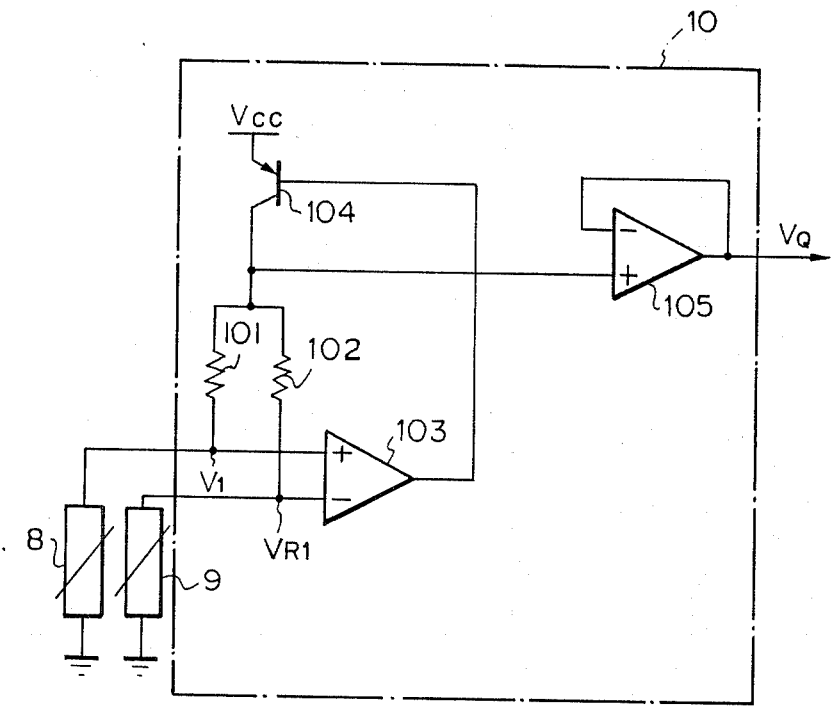
FIG. 2 is a circuit diagram of the sensing circuit of FIG. 1.

As illustrated in FIG. 2, the sensing circuit 10 includes resistors 101 and 102 which form a bridge circuit with the film resistor 8 and the temperature-dependent resistor 9; a comparator 103; a transistor 104 controlled by the comparator 103; and a voltage buffer 105. The sensing circuit 10 operates as follows. When the amount of air flowing through the intake air passage 4 increases, thus reducing the temperature of the film resistor 8, which, in this case, serves as a thermistor, the resistance value thereof decreases so as to satisfy the following condition:

$$V_1 < V_{R1}$$

where $V_1$ is the potential at the node between the resistor 101 and the film resistor 8 and $V_{R1}$ is the potential at the node between the resistor 102 and the temperature-dependent resistor 9. As a result, the output potential of the comparator 103 is reduced, thereby increasing the conductivity of the transistor 104. Therefore, the heat generated by the film resistor 8 is increased and, simultaneously, the collector potential of the transistor 104 is increased, so that the output voltage $V_Q$ of the voltage buffer 105 is also increased.

Contrary to this, when the amount of air flowing through the intake air passage 4 decreases, thus increasing the temperature of the film resistor 8, the resistance value thereof increases so as to satisfy the following condition:

$$V_1 > V_{R1}$$

As a result, the output potential of the comparator 103 is increased, thereby decreasing the conductivity of the transistor 104. Therefore, the heat generated by the film resistor 8 is decreased and, simultaneously, the collector potential of the transistor 104 is decreased, so that the output voltage $V_Q$ of the voltage buffer 105 is also decreased.

Thus, feedback control is performed upon the temperature of the film resistor 8 for a constant difference in temperature between the film resistor 8 and the temperature-dependent resistor 9, which, in this case, detects the temperature of ambient air. Thus, the output voltage $V_Q$ of the output buffer 105 indicates the amount of air flowing through the intake air passage 4.

Figure 3A:
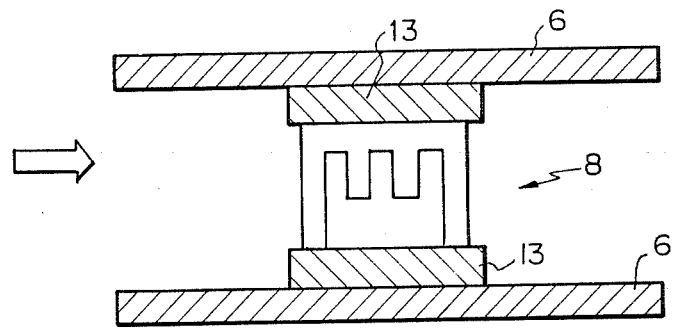
FIGS. 3A and 3B are plan and cross-sectional views, respectively, of the film resistor of FIG. 1.
Figure 3B:
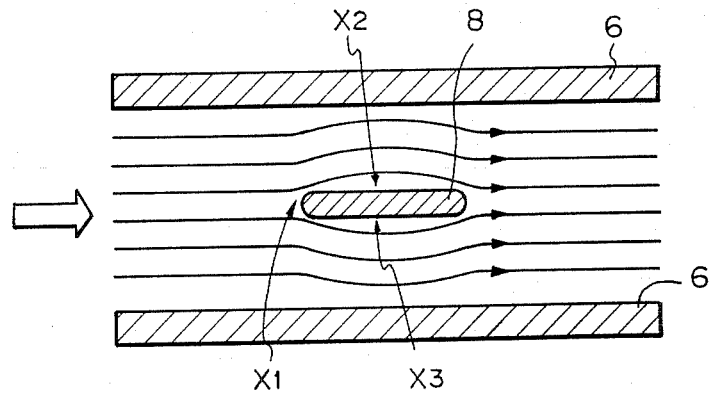
Figure 4:
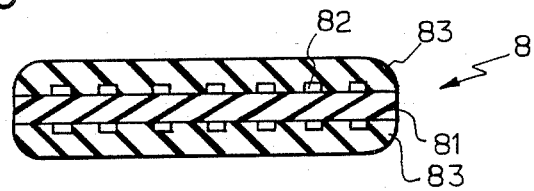
FIG. 4 is a detailed cross-sectional view of the film resistor of FIG. 1.

In FIGS. 3A and 3B, which are plan and cross-sectional views, respectively, of the film resistor 8 of FIG. 1, the film resistor 8 is fixed by a support 13 to the duct 6. In more detail, as illustrated in FIG. 4, the film resistor 8 consists of a substrate 81 made of ceramic or monocrystalline silicon, a resistance pattern 82 such as Pt or Au located on one or both of the surfaces of the substrate 81, and a heat-resistant resin layer 83 covering the resistance pattern 82.

In the above-mentioned film resistor 8, the flow rate of air is remarkably reduced around a stagnation region as indicated by an arrow $X_1$ of FIG. 3B at an edge on the upstream side around boundary regions as indicated by arrows $X_2$ and $X_3$ of FIG. 3B. Therefore, suspended particles in the air stream easily deposit on the film resistor 8 near the stagnation region and the boundary regions, thereby increasing the heat capacity and reducing the heat dissipation characteristics.

Note that it is impossible to burn off the deposits on the film resistor 8 by heating the resistor 8 itself, since the heater-resistant resin layer 83 has a low melting temperature. Further, even when the heat-resistant resin layer 83 can be made from more heat-resistant material, it is also impossible to burn off the layer 83, since, in this case, the heat mass thereof is very large.

Figure 5A:
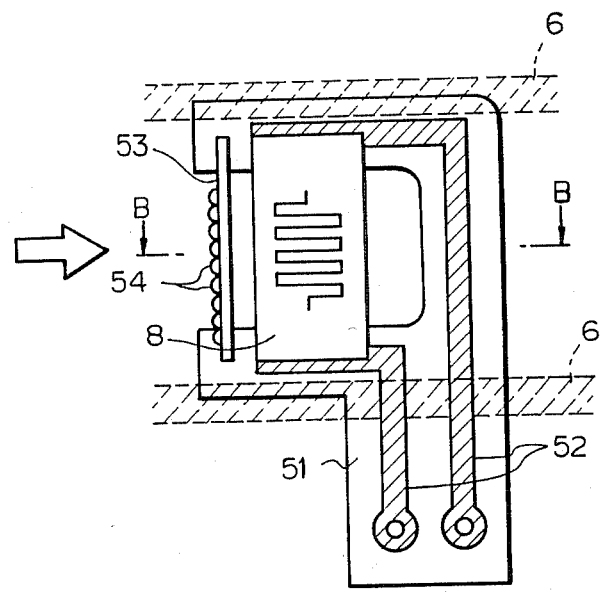
FIGS. 5A and 5B are plan and cross-sectional views, respectively,, of a first embodiment of the gas-flow measuring apparatus according to the present invention.
Figure 5B:
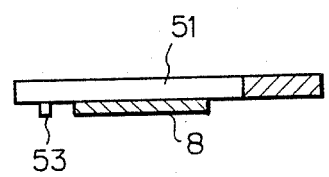

FIG. 5A illustrates a first embodiment of the present invention, and FIG. 5B a cross-sectional view taken along the line B—B of FIG. 5A. In FIGS. 5A and 5B, reference numeral 51 designates an insulator substrate on which a connection pattern 52 is formed by an evaporation process or the like. Further, the film resistor 8 is adhered by adhesives or the like to the connection pattern 52. A shield (filament member) 53 is provided on the upstream side of the film resistor 8 near thereto. In this case, the thickness of the shield 53 is about the same as that of the film resistor 8. Also, the shield 53 is located along the same coaxial plane of the film resistor 8 by the substrate 51. Due to the presence of the shield 53, suspended particles in the air stream are deposited onto the shield 53 as indicated by reference numeral 54, thus reducing the accumulation of deposits on the film resistor 8.

Figure 6A:
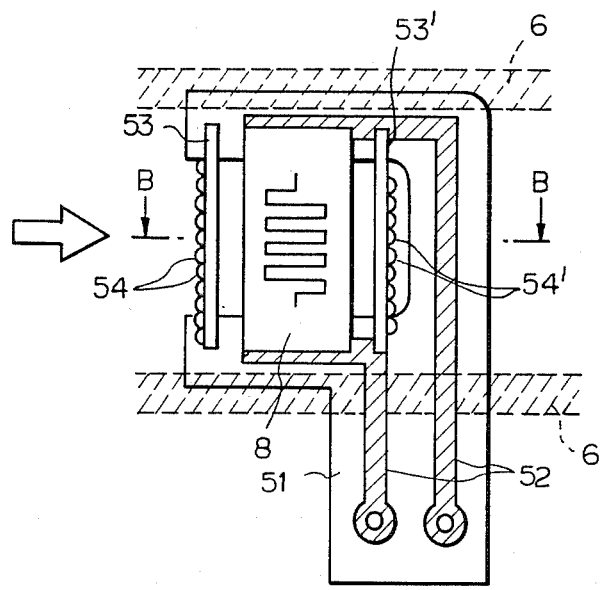
FIGS. 6A and 6B are plan and cross-sectional views, respectively, of a second embodiment of the gas-flow measuring apparatus according to the present invention.
Figure 6B:
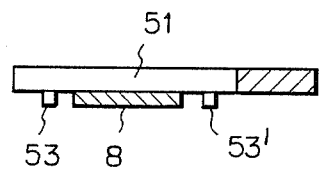

FIG. 6A illustrates a second embodiment of the present invention, and FIG. 6B a cross-sectional view taken along the line B-B of FIG. 6B. In FIGS. 6A and 6B, the elements the same as those of FIGS. 5A and 5B are denoted by the same references. That is, another shield (filament member) 53' which has the same configuration as the shield 53 is provided on the downstream side of the film resistor 8 near thereto. Therefore, when backfires occur immediately after a rapid acceleration mode or when valve overlaps occur, where a pair of inlet and exhaust valves are both closed, suspended particles in the air stream due to the blowback of combustion gas are deposited onto the trap member 54', thus also reducing the amount of deposits on the film resistor 8.

Figure 7:
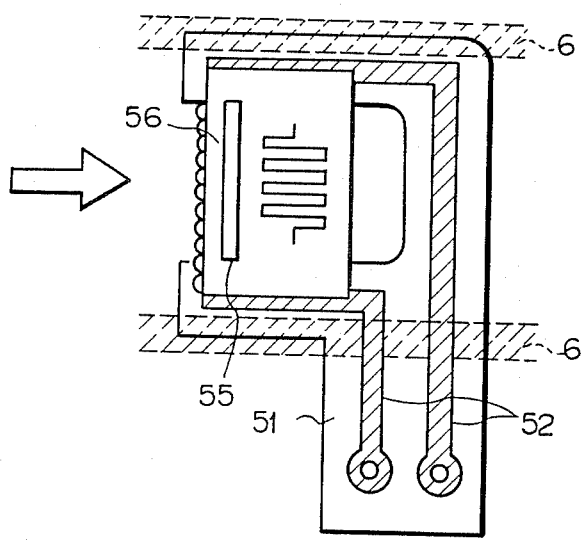
FIG. 7 is a plan view of a modification of FIG. 5A.

In FIG. 7, which is a modification of FIG. 5A, instead of providing the shield 53, a slit 55 is formed in the film resistor 8 on the upstream side thereof, so that a front edge portion 56 can serve as the shield 53 of FIG. 5A. Therefore, suspended particles in the air stream are deposited onto the front edge portion 56 of the film resistor 8, thus reducing the accumulation of deposits on the body of the film resistor 8.

Figure 8:
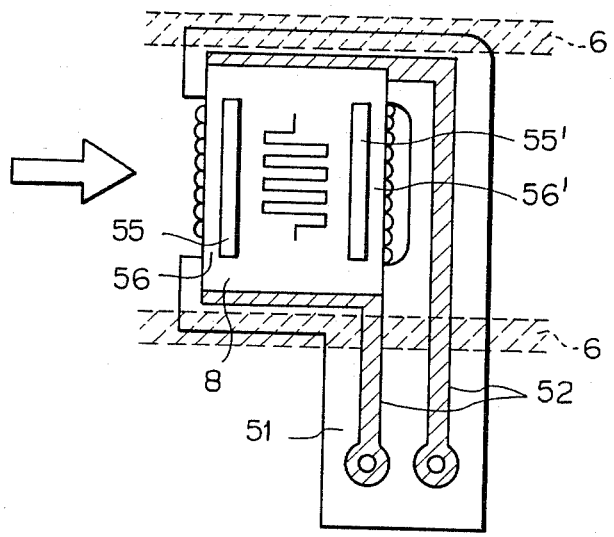
FIG. 8 is a plan view of a modification of FIG. 6A.

In FIG. 8, which is a modification of FIG. 6A, instead of providing the shield 53, a slit 55 is formed in the film resistor 8 on the upstream side thereof, so that a front edge portion 56 can serve as the shield 53 of FIG. 6A. Also, instead of providing the shield 53' of FIG. 6A, another slit 55' is formed in the film resistor 8 on the downstream side thereof. Thus, a rear edge portion 56' can serve as the shield 53' of FIG. 6B. Therefore, suspended particles in the air stream are deposited onto the front edge portion 56 of the film resistor 8. On the other hand, when backfires or valve overlaps occur, suspended particles due to the blowback of combustion gas are deposited onto the rear edge portion 56' of the film resistor 8. Thus, the accumulation of deposits on the body o the film resistor 8 is again reduced.

Figure 9A:
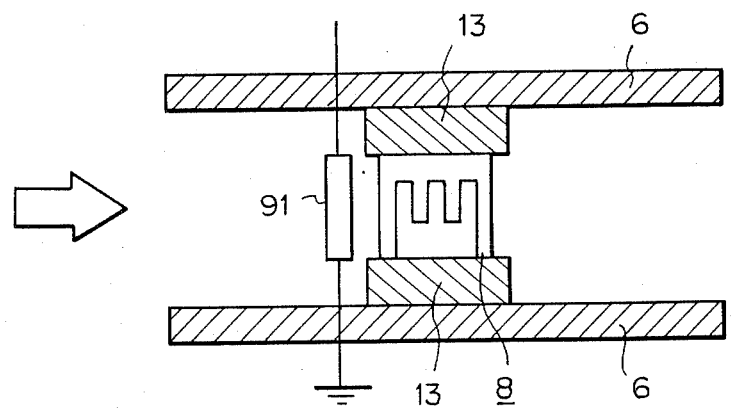
FIGS. 9A and 9B are plan and cross-sectional views, respectively, of a third embodiment of the gas-flow measuring apparatus according to the present invention.
Figure 9B:
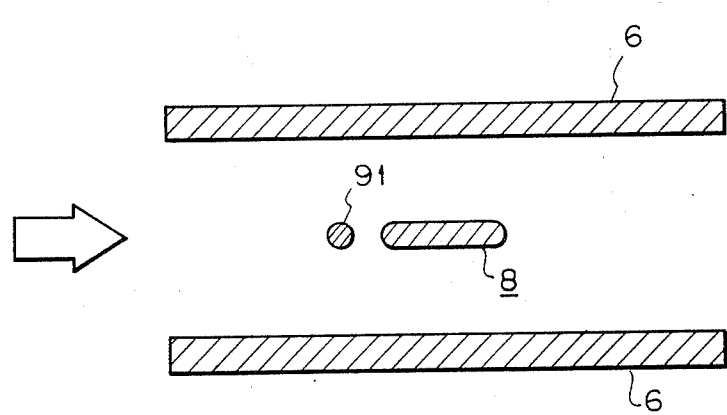

In FIGS. 9A and 9B, which illustrate a third embodiment of the present invention, reference numeral 91 designates a heating element, which also serves as the trap member 53 of FIGS. 5A and 5B. Suspended particles in the air stream are deposited onto the heating element 91, thus reducing the accumulation of deposits on the film resistor 8. In addition, such deposits on the heating element 91 can be burned off by a burning circuit which will be explained later in detail.

Figure 10:
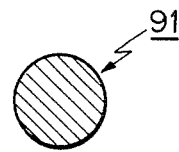
FIGS. 10 through 13 are cross-sectional views of the heater resistor of FIGS. 9A and 9B.
Figure 11:
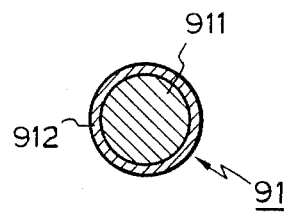

Note that the thickness of the heating element 91 is also about the same as that of the film resistor 8, and the heating element 91 is located along the coaxial plane of the film resistor 8. However, regarding the cross-sectional configuration of the heating element 91, various modifications are possible, as illustrated in FIGS. 10 through 13. In FIGS. 10 and 11, the cross-section of the heating element 91 is rounded, while in FIGS. 12 and 13, the cross-section of the heating element 91 is streamlined. The configuration of the latter has the advantage, compared with the former, that the boundary regions of the film resistor 8 can be made thin, and the fluctuation of the air stream, such as Karman's vortex street, can be reduced, thereby improving the output characteristics of the airflow meter.

Figure 12:
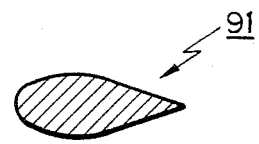
Figure 13:
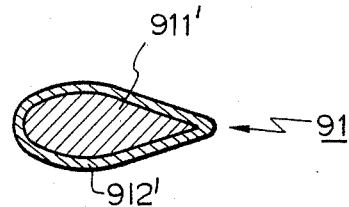

In FIGS. 10 and 12, the heating element 91 may consist entirely of Pt or the like, while in FIGS. 11 and 13, the heating element 91 may consist of a carrier 911 (911') such as ceramic and a thermistor film 912 (912') on the surface of the carrier 911 (911').

Figure 14A:
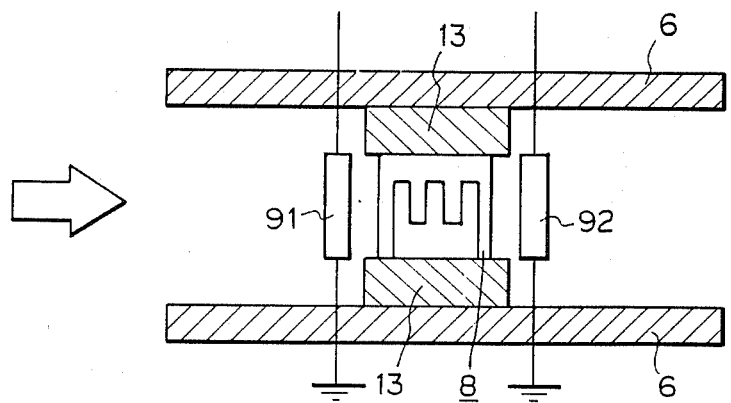
FIGS. 14A and 14B are plan and cross-sectional views, respectively, of a fourth embodiment of the gas-flow measuring apparatus according to the present invention.
Figure 14B:
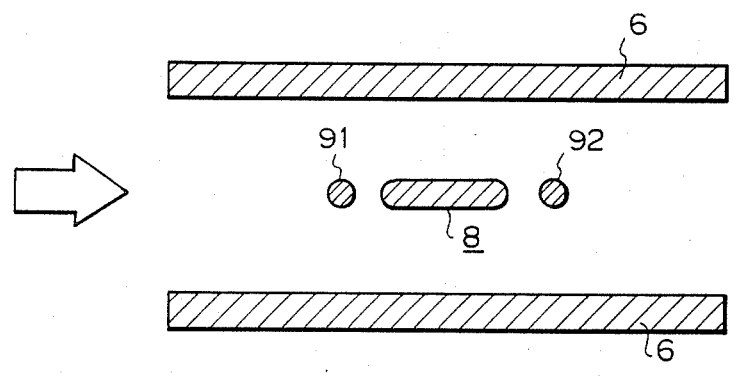

In FIGS. 14A and 14B, which illustrate a fourth embodiment of the present invention, another heating element 92 is added to the elements of FIGS. 9A and 9B. Therefore, when backfires or valve overlaps occur, suspended particles due to the blowback of combustion gas are deposited onto the heating element 92, thus reducing the accumulation of deposits on the film resistor 8. In addition, such deposits on the heating element 92 can be burned off by the burning circuit.

The configuration of the heating element 92 is the same as that of the heating element 91. That is, the configuration of the heating element 92 is also illustrated in FIGS. 10 through 13, except that the direction of the streamline of FIGS. 12 and 13 is reversed, i.e., the cross-section on the upstream side is rounded while that on the downstream side is sharp.

The burning circuit for heating the heating element 91 (92) will now be explained with reference to FIGS. 15 and 16. Note that the burning circuit can be incorporated in the sensing circuit 10 or the control circuit 11.

Figure 15:
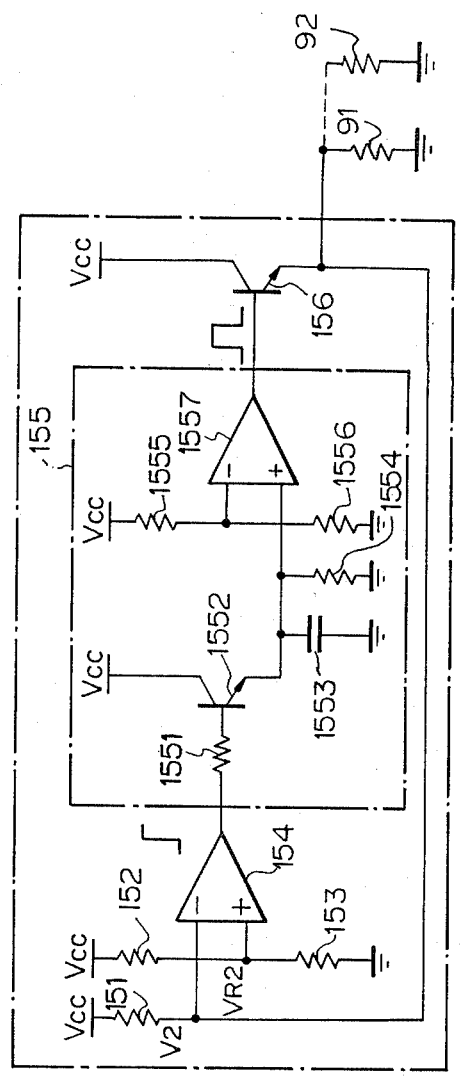
FIGS. 15 and 16 are circuit diagrams of the burning circuit for heating up the heater resistor of FIGS. 9A and 9B.

In FIG. 15, reference numerals 151, 152, and 153 designate resistors forming a bridge circuit with the heating element 91, 154 a comparator, 155 a one-shot multivibrator, and 156 a driving transistor. The one-shot multivibrator 155 includes a resistor 1551, a transistor 1552, a capacitor 1553, resistors 1554, 1555, and 1556, and a comparator 1557. $V_{CC}$ designates a power supply voltage such as 5V supplied indirectly from a battery (not shown). When suspended particles in the air stream are deposited onto the heating element 91, the resistance value thereof is reduced so as to satisfy the following condition:

$$V_2 < V_{R2}$$

where $V_2$ is the potential at the node between the resistor 151 and the heating element 91, and $V_{R2}$ is the potential at the node between the resistors 152 and 153. As a result, the output potential of the comparator 154 rises. Accordingly, in the one-shot multivibrator 155, the transistor 1552 is turned on so as to satisfy the following condition:

$$V_3 > V_{R3}$$

where $V_3$ is the potential at the node between the transistor 1552 and the capacitor 1553, and $V_{R3}$ is the potential at the node between the resistors 1555 and 1556. Therefore, the comparator 1557 generates a high potential signal whose duration $\tau_1$ is determined by the capacitor 1553 and the resistor 1554. Thus, the transistor 156 is turned on for the duration $\tau_1$. Accordingly, the heating element 91 is heated so as to burn off the deposits thereon.

Note that the circuit of FIG. 15 can be applied to the heating elements 91 and 92 of FIGS. 14A and 14B. The heating element 92 is, in this case, connected in parallel to the heating element 91.

Thus, according to the burning circuit of FIG. 15, the heating element 91 (92) is heated up for a predetermined time period ($\tau_1$) every time the resistance value of the heating element 91 becomes smaller than a predetermined value, which is determined by the resistors 152 and 153.

Figure 16:
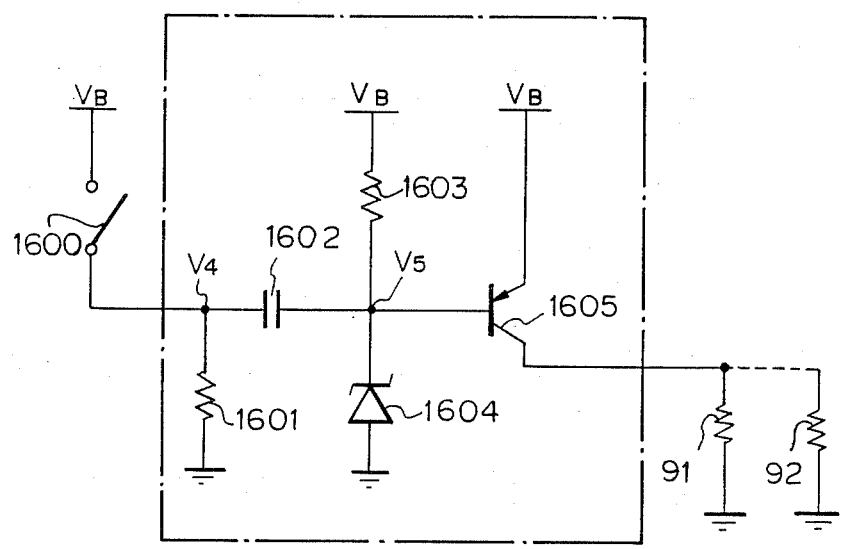

In FIG. 16, reference numeral 1600 designates an ignition switch, 1601 a resistor, 1602 a capacitor, 1603 a resistor, 1604 a Zener diode having a Zener voltage of +12V, and 1605 a driving transistor. $V_B$ designates a power supply voltage such as +12 V supplied directly from a battery (not shown). When the ignition switch 1600 is turned on, the potential $V_4$ at the node between the ignition switch 1600 and the resistor 1601 increases from 0V to $V_B$. Simultaneously, the voltage $V_5$ at the node between the resistor 1603 and the Zener diode 1604 becomes a little high, however, the voltage $V_5$ remains approximately at $V_B$. Therefore, the transistor 1605 remains at a nonconducting state so that no current is supplied to the heating element 91. Next, when the ignition switch 1600 is turned off, the potential $V_4$ decreases from $V_B$ to 0V, and, simultaneously, the potential $V_5$ decreases from $V_B$ to 0V due to the capacitive coupling of the capacitor 1602. As a result, the transistor 1605 is turned on so that current is supplied to the heating element 91. In this case, the on-duration ($\tau_2$) of the transistor 1605 is determined by the resistance value of the resistor 1603 and the on-resistance value between the base and emitter of the transistor 1605.

The circuit of FIG. 16 can be also applied to the heating elements 91 and 92 of FIGS. 14A and 14B in the same way as the circuit of FIG. 15.

Thus, according to the burning circuit of FIG. 16, the heating element 91 (92) is heated for a predetermined time period ($\tau_2$) every time the ignition switch 1600 is turned off.

Also, it is possible to heat the heating element 91 (92) every predetermined time period. This can be easily made by introducing a time interruption routine into the control circuit 11, which is, in this case, a microcomputer. Further, it is possible to heat up the heating element 91 (92) every time the number of the off operations of the ignition switch 1600 reaches a predetermined value. This number is, in this case, stored in a backup random access memory (not shown) of the control circuit 11.

Figure 17:
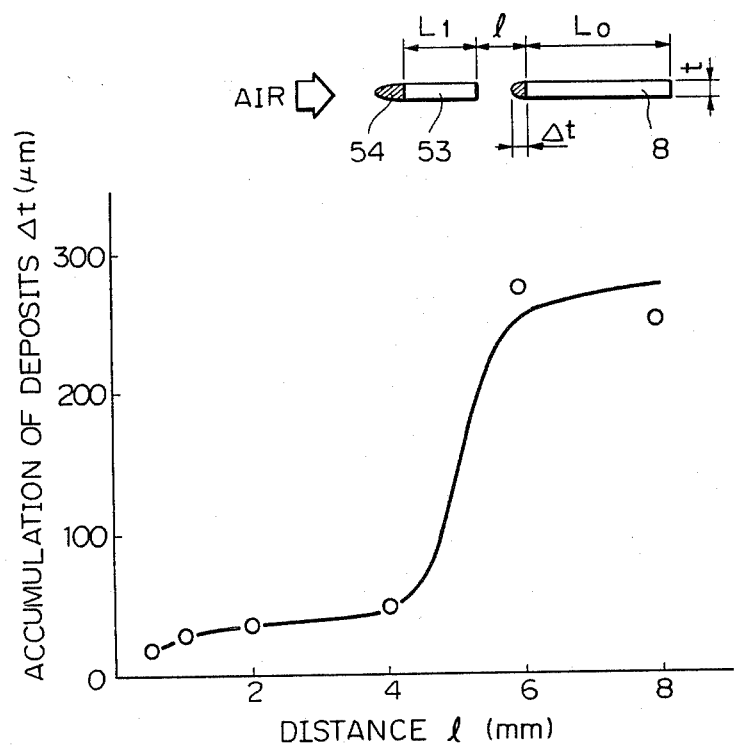
FIGS. 17 and 18 are diagrams for explaining the effect of the present invention.
Figure 18:
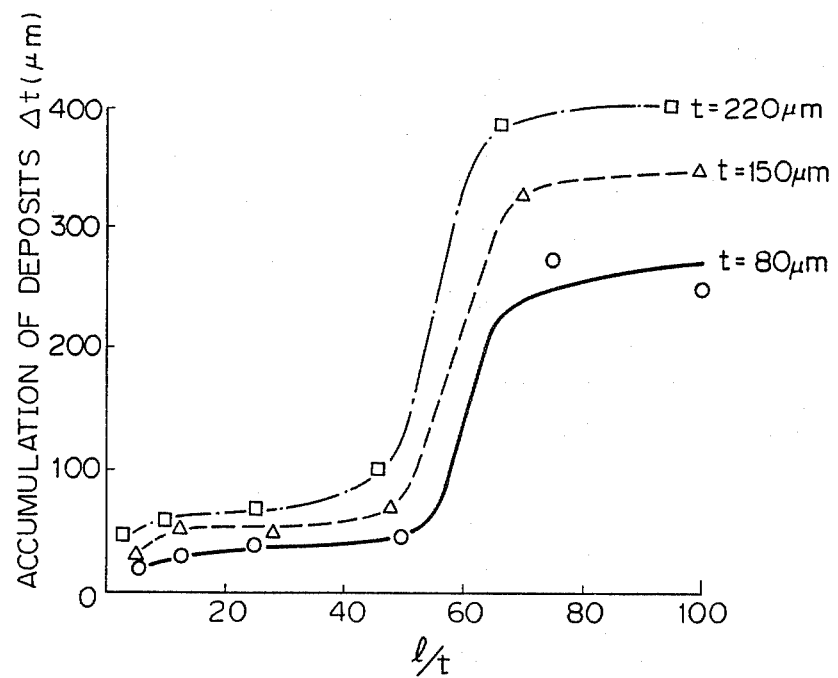

FIGS. 17 and 18 are graphs for explaining the effect of the present invention. That is, FIG. 17 shows the relationship of the accumulation $\Delta t$ of deposits on the film resistor 8 and the distance l between the shield 53 and the film resistor 8 (see FIG. 5A). In this case, the thickness t of the shield 53 and the film resistor 8 is 80 μm, the length $L_0$ of the film resistor 8 is 1 mm, and the length $L_1$ of the shield 53 is 0.5 mm. Under the condition that the air flow rate is 200 g/s for 300 hours, as shown in FIG. 17, the accumulation $\Delta t$ of deposits on the film resistor 8 is remarkably increased when the distance l is larger than 5 mm. The accumulation $\Delta t$ of deposits on the film resistor 8 may be dependent upon other parameters, such as the thickness of the shield 53, the thickness of the film resistor 8, the length $L_1$ of the shield 53, the length $L_0$ of the film resistor 8, and the like, but the inventors found that the accumulation of deposits on the film resistor 8 is basically dependent upon only the ratio of the distance l to the thickness of the shield 53 and the film resistor 8, as shown in FIG. 18. As can be easily understood from FIG. 18, the accumulation $\Delta t$ of deposits on the film resistor 8 is remarkably increased when the ratio l/t is larger than 50, regardless of the thickness t.

Note that experimental results similar to those of FIGS. 17 and 18 were obtained for the other embodiments as illustrated in FIGS. 6A, 7, 8, and 9A.

As explained hereinbefore, according to the present invention, the accumulation of deposits on the film resistor can be reduced, thereby maintaining the sensitivity and response characteristics.

We claim:

1. A direct-heated type gas-flow measuring apparatus comprising:
   a flow passage for the gas flow to be measured;
   a film resistor, disposed in said flow passage parallel with the gas flow, for generating heat within said flow passage;
   a shield, disposed upstream of said film resistor in the coaxial plane of said film resistor, for reducing the accumulation of deposits on said film resistor, said shield including a heating element for burning off dirt, said shield having substantially the same thickness as that of said film resistor, said shield being sized and positioned so as to satisfy the condition:

$$l_1/t \leq 50$$

where "$l_1$" is the distance between said shield and said film resistor, and "t" is the thickness of said shield and said film resistor;
   means for heating said heating element of said shield; and
   feedback control means, connected to said film resistor, for providing power to and controlling the heat generated by said film resistor and generating a control signal indicative of the temperature of said film resistor;
   measuring means for providing, in response to said control signal, an indication of the rate of the gas flow.

2. An apparatus as set forth in claim 1,
   further comprising a temperature-dependent resistor disposed in said flow passage, said temperature-dependent resistor being not substantially affected by the heat generated from said film resistor,
   said feedback control means further comprising means for controlling the heat generated by said film resistor so as to maintain a constant difference in temperature between said film resistor and said temperature -dependent resistor.

3. An apparatus set forth in claim 1, wherein said heating element is rounded in cross-section.

4. An apparatus as set forth in claim 1, wherein said heating element is of a streamlined shape in cross-section in that the portion on the upstream side is rounded and the portion on the downstream side is tapered.

5. An apparatus as set forth in claim 1, wherein said heating element comprises a carrier and a thermistor film formed on the surface of said carrier.

6. An apparatus as set forth in claim 1, wherein said heating means heats said heating element for a predetermined time period every time the resistance value of said heating element becomes lower than a predetermined value.

7. An apparatus as set forth in claim 1, further comprising a switch, said heating means heating said heating element for a predetermined time period every time said switch is turned off.

8. A direct-heated type gas-flow measuring apparatus comprising:
- a flow passage for the gas flow to be measured;
- a film resistor, disposed in said flow passage parallel with the gas flow, for generating heat within said flow passage;
- a first shield, disposed upstream of said film resistor in the coaxial plane of said film resistor, for reducing the accumulation of deposits on said film resistor, said first shield including a heating element for burning off dirt said shield having substantially the same thickness as that of said film resistor, said first shield being sized and positioned so as to satisfy the condition:

$$l_1/t \leq 50$$

where "$l_1$" is the distance between said shield and said film resistor, and "$t$" is the thickness of said shield and said film resistor;
- means for heating said heating element of said shield; and
- feedback control means, connected to said film resistor, for providing power to and controlling the heat generated by said film resistor and generating a control signal indicative of the temperature of said film resistor;
- measuring means for providing, in response to said control signal, an indication of the rate of the gas flow; and
- a second shield, disposed downstream of said film resistor near thereto and in the coaxial plane of said film resistor, for reducing the accumlation deposites on said film resistor, said second shield comprising a second heating element for burning off dirt.

9. An apparatus as set forth in claim 8, wherein said shield has substantially the same thickness as said film resistor.

10. An apparatus as set forth in claim 9, wherein $$l_2/t \leq 50$$

wherein $l_2$ is a distance between said second shield and said film resistor.

11. An apparatus as set forth in claim 8, wherein said second heating element is rounded in cross-section.

12. An apparatus as set forth in claim 8, wherein said second heating element is of a streamlined shape in cross-section in that the portion on the upstream side is tapered and the portion on the downstream side is rounded.

13. An apparatus as set forth in claim 8, wherein said second heating element comprises a carrier and a thermistor film formed on the surface of said carrier.

14. An apparatus as set forth in claim 8, wherein said heating means heats said second heating element for a predetermined time period every time the resistance value of said second heating element becomes lower than a predetermined value.

15. An apparatus as set forth in claim 8, further comprising a switch, said heating means heating said second heating element for a predetermined time period every time said switch is turned off.

16. A direct-heated type gas-flow measuring apparatus comprising:
- a flow passage for the gas flow to be measured;
- a film resistor, disposed in said flow passage, for generating heat and detecting the temperature thereof, said film resistor being arranged in parallel to the gas flow;
- a shield, disposed on the upstream side of said film resistor near thereto along the same coaxial plane of said film resistor, for reducing the accumulation of deposits on said film resistor, said shield having substantially the same thickness as that of said film resistor, said shield comprising a heating element for burning off dirt, said heating element being of a streamlined shape in cross-section in that the portion on the upstream side is rounded and the portion on the downstream side is tapered;
- means for heating said heating element;
- feedback control means, connected to said film resistor, for controlling the heat generated by said film resistor so as to generate a control signal relating to the temperature of said film resistor; and
- measuring means for measuring the rate of the gas flow by receiving said control signal.

17. A direct-heated type gas-flow measuring apparatus comprising:
- a flow passage for the gas flow to be measured;
- a film resistor, disposed in said flow passage, for generating heat and detecting the temperature thereof, said film resistor being arranged in parallel to the gas flow;
- a shield, disposed on the upstream side of said film resistor near thereto along the same coaxial plane of said film resistor, for reducing the accumulation of deposits on said film resistor, said shield having substantially the same thickness as that of said film resistor, said shield comprising a heating element for burning off dirt;
- means for heating said heating element, said heating means heating said heating element for a predetermined time period every time the resistance value of said heating element becomes lower than a predetermined value;
- feedback control means, connected to said film resistor, for controlling the heat generated by said film resistor so as to generate a control signal relating to the temperature of said film resistor; and
- measuring means for measuring the rate of the gas flow by receiving said control signal.

18. A direct-heated type gas-flow measuring apparatus comprising:
- a flow passage for the gas flow to be measured;
- a film resistor, disposed in said flow passage, for generating heat and detecting the temperature thereof, said film resistor being arranged in parallel to the gas flow;
- first and second shields, disposed on the upstream and downstream sides, respectively, of said film resistor near thereto along the same coaxial plane of said film resistor, for reducing the accumulation of deposits on said film resistor, said first shield having substantially the same thickness as that of said film resistor, said second shield comprising a heating element for burning off dirt, said heating element being of a streamlined shape in cross-section in that the portion on the upstream side is tapered and the portion on the downstream side is rounded;
- feedback control means, connected to said film resistor, for controlling the heat generated by said film resistor so as to generate a control signal relating to the temperature of said film resistor; and measuring means for measuring the rate of the gas flow by receiving said control signal.

19. A direct-heated type gas-flow measuring apparatus comprising:
a flow passage for the gas flow to be measured;
a film resistor, disposed in said flow passage and arranged in parallel to the gas flow;
first and second shields, disposed upstream and downstream, respectively, of said film resistor near thereto along the same coaxial plane of said film resistor, for reducing the accumulation of deposits on said film resistor, said first shield having substantially the same thickness as that of said film resistor, said second shield comprising a heating element for burning off dirt,
means for heating said heating element for a predetermined time period every time the resistance value of said another heating element becomes lower than a predetermined value;
feedback control means, connected to said film resistor, for providing power to and controlling the heat generated by said film resistor and providing a control signal relating to the temperature of said film resistor; and
measuring means for providing, responsive to said control signal, an indication of the rate of the gas flow in said flow passage.

* * * * *